United States Patent [19]

Kubo et al.

[11] Patent Number: 5,057,596

[45] Date of Patent: Oct. 15, 1991

[54] CROSSLINKED POLYESTER RESIN FROM TRIHYDRIC ALCOHOL

[75] Inventors: Shinji Kubo; Noriyuki Tajiri; Masayuki Takyu, all of Toyohashi; Ryo Funato; Hirokazu Ito, both of Nagoya, all of Japan

[73] Assignee: Mitsubishi Rayon Company Ltd., Tokyo, Japan

[21] Appl. No.: 553,415

[22] Filed: Jul. 17, 1990

[30] Foreign Application Priority Data

Jul. 17, 1989 [JP] Japan .................................. 1-184373

[51] Int. Cl.$^5$ .............................................. C08G 68/02
[52] U.S. Cl. ..................................... 528/272; 528/296; 528/298; 528/302; 528/305; 528/307; 528/308
[58] Field of Search ............... 528/272, 296, 298, 302, 528/305, 307, 308

[56] References Cited

U.S. PATENT DOCUMENTS 4,849,495  7/1989  Funato et al. ....................... 528/194
4,866,158  9/1989  Kubo et al. ......................... 528/272

Primary Examiner—Harold D. Anderson
Assistant Examiner—T. Mosley
Attorney, Agent, or Firm—Oblon, Spivak, McClelland, Maier & Neustadt

[57] ABSTRACT

Disclosed is a crosslinked polyester resin comprised of, based on the total acid units, (a) 1 to 30 mole % of units of a trihydric or higher alcohol or units of a trivalent or higher carboxylic acid, (b) 1 to 60 mole % of units of an alicyclic diol in which at least one alcohol component is a secondary alcohol, (c) 40 to 100 mole % of units of an aromatic dicarboxylic acid and (d) 40 to 99 mole % of units of a non-alicyclic diol, wherein the acid value is 0.5 to 25 mg-KOH/g, the glass transition temperature is 50° to 80° C., the softening temperature is not higher than 145° C., the fixing-possible temperature covers a range of at least 30° C., and the difference between the softening temperature and the glass transition temperature is not larger than 75° C. The crosslinked polyester is used for toner for electrostatic recording.

12 Claims, No Drawings

CROSSLINKED POLYESTER RESIN FROM TRIHYDRIC ALCOHOL

BACKGROUND OF THE INVENTION (1) Field of the Invention

The present invention relates to a crosslinked polyester for use in the production of a toner. More particularly, the present invention relates to a cross-linked polyester resin which has good and balanced low-temperature fixing property, offset resistance, blocking resistance and abrasion resistance, which is used for developing a latent image formed by the electrostatic printing method or the like.

(2) Description of the Related Art

In the conventional electrophotographic process, in general, a latent image is formed on a latent image-forming roller composed of a photoconductive photosensitive material by charging and light exposure, the latent image is developed with a toner, the obtained toner image is transferred onto a paper sheet or the like, and the toner image is fixed by heating or application of a pressure to form a print having a fixed image.

It is desired to perform this image-forming treatment through a latent image at a high speed, and a hot roller fixing method capable of performing the fixing operation at a high thermal efficiency and an elevated speed is widely adopted at the fixing step.

Recently, the desire to further elevate the speed is increasing, and for satisfying this desire, the toner must have a good low-temperature fixing property to fix a toner image at a high speed. For this purpose, the softening temperature of the binder which is the main component of the toner must be lowered and the adhesiveness of the binder must be improved. However, if the softening temperature of a resin is lowered, the glass transition temperature (hereinafter referred to as "Tg") is simultaneously lowered, and therefore, a good storage stability cannot be obtained and blocking readily occurs. Moreover, the toner powder supplied by a high-speed feed machine undergoes a strong external force by violent agitation or the like, and hence, the toner powder is excessively finely divided and the balance among entire physical properties is lost.

Extensive researches were made for solving these problems and several proposals were made.

According to the first proposal, an offset-resistant toner is provided by using, as a binder, a crosslinked polyester obtained by reacting an etherified bisphenol. A component with a dicarboxylic acid component to obtain a linear polyester and adding a trivalent or higher polyvalent monomer component, for example, trimellitic acid, to form a crosslinked structure.

The second proposal relates to a process for improving the low-temperature fixing property by reducing the molecular weight of a binder to improve the flowability of the binder.

According to the third proposal, the low-temperature fixing property is improved by using a binder having long-chain aliphatic hydrocarbon units.

The first proposal, however, has a problem in that the fixing property is not satisfactorily good, and when the fixing operation is continuously carried out at such a high speed as at least 50 prints per minute, the toner is not sufficiently heated at the fixing temperature adopted and the fixing strength is often unsatisfactory. Moreover, the first proposal involves a problem in that fine particles are accumulated as the operation is continued, and the image quality is degraded.

It was found that in the process of reducing the molecular weight according to the second proposal, the offset resistance is degraded and no practical toner can be prepared.

The glass transition temperature of the polyester of the third proposal is too low, and the storage stability is degraded.

SUMMARY OF THE INVENTION

An object of the present invention is to overcome the above-mentioned disadvantages of the conventional techniques and provide a crosslinked polyester for the production of a toner or the like, which has good low-temperature fixing property, offset resistance and blocking resistance.

More specifically, in accordance with the present invention, there is provided a crosslinked polyester resin which is a non-linear polycondensate comprising (a) 1 to 30 mole%, based on the total acid units, of units of a trihydric or higher alcohol or units of a trivalent or higher carboxylic acid, (b) 1 to 60 mole%, based on the total acid units, of units of an alicyclic diol in which at least one alcohol component is a secondary alcohol, (c) 40 to 100 mole%, based on the total acid units, of units of an aromatic dicarboxylic acid and (d) 40 to 99 mole%, based on the total acid units, of units of a non-alicyclic diol, wherein the acid value is 0.5 to 25 mg-KOH/g, the glass transition temperature is 50° to 80° C., the softening temperature is not higher than 145° C., the fixing-possible temperature covers a range of at least 30° C., and the difference between the softening temperature and the glass transition temperature is not larger than 75° C.

The crosslinked polyester resin of the present invention can be used as a binder for a toner or the like, which has good and balanced low-temperature fixing property, offset resistance, blocking resistance and abrasion resistance and is used for electrostatic recording.

DESCRIPTION OF THE PREFERRED EMBODIMENTS

In the instant specification, the total acid units mean all of units of trivalent and higher polyvalent acids, units of dicarboxylic acids and units of monocarboxylic acids.

The acid value is determined by the neutralization titration method, the glass transition temperature is determined by the method using a differential scanning calorimeter (DSC), and the softening temperature is determined according to the following method. Namely, by using a flow tester (Model CFT-500 supplied by Shimadzu Corp.), the temperature is elevated at a constant rate of 3° C./min under a load of 30 kg and a sample is let to flow through a nozzle with an orifice having a diameter of 1 mm and a length of 1 mm, and the temperature at which ½ of the sample has flowed out is measured as the softening temperature.

The units of a trihydric or higher polyhydric alcohol used in the present invention are derived from a trihydric or higher polyhydric alcohol by the reaction thereof with a carboxylic acid, and are represented by the following formula:

wherein m and n are integers satisfying the requirements of $(m+n) \geq 3$, $m \geq 0$ and $n \geq 1$, and $R_1$ represents a hydrocarbon residue.

As the polyhydric alcohol constituting these units, there can be mentioned, for example, sorbitol, 1,2,3,6-hexanetetrol, 1,4-sorbitane, pentaerythritol, dipentaerythritol, tripentaerythritol, sucrose, 1,2,4-butanetriol, 1,2,5-pentatriol, glycerol, 2-methylpropanetriol, 2-methyl-1,2,4-butanetriol, trimethylolethane, trimethylolpropane, and 1,3,5-trihydroxymethylbenzene. The polyhydric alcohol units are formed by reacting these polyhydric alcohols with a carboxylic acid component.

The units of a trivalent or higher polyvalent carboxylic acid are derived from a trivalent or higher polyvalent carboxylic acid component by the reaction thereof with an alcohol, and are represented by the following formula:

wherein m' and n' are integers satisfying the requirements of $(m'+n') \geq 3$, $m' \geq 0$ and $n' \geq 1$, $R_2$ represents a hydrocarbon residue and $R_3$ represents an alkyl group having 1 to 6 carbon atoms or a hydrogen atom.

As the polyvalent carboxylic acid constituting these units, there can be mentioned, for example, 1,2,4-benzene-tricarboxylic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylene-carboxyl-propane, tetra(methylene-carboxyl)methane, and 1,2,7,8-octanetetracarboxylic acid, and acid anhydrides thereof and lower alkyl esters thereof having 1 to 6 carbon atoms in the alkyl group. The polyvalent carboxylic acid units are formed by reacting these polyvalent carboxylic acids with an alcohol.

The total amount of the units derived from trivalent or higher polyhydric alcohol and/or polyvalent carboxylic acid is preferably 1 to 30 mole% and preferably 3 to 20 mole% based on the amount of the total acid units in the cross-linked polyester, that is, the units derived from carboxylic acid units by the reaction thereof with alcohols. If the content of the units derived from the polyhydric alcohol and/or polyvalent carboxylic acid exceeds 30 mole%, control of the reaction becomes difficult, and if the content of these units is lower than 1 mole%, a sufficiently crosslinked structure cannot be obtained and offset occurs.

The units of an alicyclic diol in which at least one alcohol component is a secondary alcohol, which constitute the crosslinked polyester resin of the present invention, are derived from an alcohol having at least one hydroxyl group bonded to the secondary carbon, and are represented by the following formula:

wherein j and k are integers satisfying the requirements of $j \geq 0$, $k \geq 1$ and $(j+k)=2$, and $R_4$ represents an alicyclic hydrocarbon residue, with the proviso that at least one oxygen atom is bonded to the secondary carbon atom of $R_4$.

As the alicyclic secondary diol constituting these units, there can be mentioned, for example, 1,4-cyclohexane-diol, hydrogenated bisphenol A, polyoxypropylene-2,2-bis(4-hydroxycyclohexyl)propane, hydrogenated bisphenol S, hydrogenated bisphenol F, 1,4-bis(1-hydroxyethyl)cyclohexane, polyoxypropylene-1,4-cyclohexanediol, and 4,4'-biscyclohexyl-diol.

The alicyclic diol units are formed by the reaction of the alicylic secondary diol with an acid component.

The above-mentioned alicyclic diol units is effective not only for improving the glass transition temperature and lowering the softening point but also for improving the abrasion resistance of the resin and preventing troubles such as degradation of the quality caused by formation of finely divided particle during use of the toner. Furthermore, since the starting material is a secondary diol, control of the reaction is easy. The content of these alicyclic secondary diol units is 1 to 60 mole% and preferably 5 to 50 mole% based on the total acid units. If the content of the alicyclic diol units is lower than 1 mole%, the effects expected in the present invention cannot be obtained and if the content of the alicyclic diol units is higher than 60 mole%, advance of the reaction is slow.

The aromatic dicarboxylic acid units constituting the crosslinked polyester of the present invention are derived from an aromatic dicarboxylic acid component by the reaction thereof with an alcohol, and are represented by the following formula:

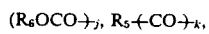

wherein j' and k' are integers satisfying the requirements of $(j'+k')=2$, $j' \geq 0$, and $k \geq 1$, $R_5$ represents a hydrocarbon residue and $R_6$ represents an alkyl group having 1 to 6 carbon atoms or a hydrogen atom.

As the aromatic dicarboxylic acid constituting these units, there can be mentioned, for example, dicarboxylic acids such as terephthalic acid, isophthalic acid, orthophthalic acid, cyclohexanedicarboxylic acid, 3,5-toluenedicarboxylic acid, 2,4-toluenedicarboxylic acid and 2,5-toluenedicarboxylic acid, and acid anhydrides thereof and lower alkyl esters thereof having 1 to 6 carbon atoms in the alkyl group. These aromatic dicarboxylic acid units are formed by reacting the aromatic dicarboxylic acid with an alcohol. The aromatic dicarboxylic acid units make a contribution to the improvement of the glass transition temperature. Among these units, units derived from terephthalic acid and isophthalic acid (referred to as "terephthalic acid units" and "isophthalic acid units", respectively) are preferable because the softening temperature of the crosslinked polyester is drastically lowered by the terephthalic acid and isophthalic acid units. In view of influences on the glass transition temperature, the content of these units is 40 to 100 mole% and preferably 50 to 100 mole% based on the total acid units. If the content of the aromatic dicarboxylic acid units is lower than 40 mole%, the glass transition temperature is lowered and blocking of the resin readily occurs.

The non-alicyclic diol units constituting the crosslinked polyester of the present invention are derived from a non-alicyclic diol by the reaction thereof with a dicarboxylic acid, and are represented by the following formula:

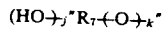

wherein j" an k" are integers satisfying the requirements of $(j''+k'')=2$, $j'' \geq 0$ and $k'' \geq 1$, and $R_7$ represents a non-alicyclic hydrocarbon residue.

As the non-alicyclic diol constituting these units, there can be mentioned, for example, polyoxypropylene-2,2-bis(4,-hydroxyphenyl)propane, polyoxyethylene-2,2-bis(4,-hydroxyphenyl)propane, 1,2-propylene glycol, 1,3-butanediol, 2,3-butanediol, 2-methyl-1,3-propanediol, neopentyl glycol, 1,2-dimethyl-1,3-propanediol, 1,3-dimethyl-1,3-propanediol, 1,2,3-trimethyl-1,3-propanediol, 2,3-dimethyl-1,4-propanediol, 3,3-diethyl-1,5-pentanediol, diethylene glycol, triethylene glycol, tetramethylene glycol, polyethylene glycol having an average molecular weight lower than 450, ditrimethylene ether glycol, trimethylene diether glycol, ethylene propylene ether glycol, ditetramethylene glycol, ethylene tetramethylene ether glycol, trimethylene tetramethylene ether glycol, and polyoxytetramethylene glycol having a molecular weight lower than 350. These units are formed by the reaction of a non-alicyclic diol as mentioned above with a carboxylic acid. The content of these units is 40 to 99 mole% based on the total acid units.

An aliphatic dicarboxylic acid, a monocarboxylic acid, a monohydric alcohol or the like can be added, as long as the intended object of the present invention can be attained.

The crosslinked polyester used in the present invention must have physical properties described below.

In order for the crosslinked polyester resin to be used as a binder providing a toner having good heat stability and charging stability and high abrasion resistance and mechanical stability, as intended in the present invention, the acid value of the crosslinked polyester resin must be not larger than 25 mg-KOH/g, and is preferably not larger than 20 mg-KOH/g. A technical method, for example, a method in which the reaction temperature is reduced, has already been established for synthesizing a polyester having a very small acid value, but it is practically difficult to obtain a polyester having an acid value smaller than 0.5 mg-KOH/g, and more practically, the acid value is not smaller than 2mg-KOH/g. Namely, the acid value of the crosslinked polyester used in the present invention is 0.5 to 25 mg-KOH/g, preferably 2 to 20 mg-KOH/g. If the acid value is outside this range, the heat stability as one general property of a polyester is drastically degraded, and the charging stability as one important property for a toner is degraded because of an increase of the hygroscopic property and an increase of the negative chargeability by carboxyl groups.

The glass transition temperature is an important criterion of the storage stability. If the glass transition temperature is lower than 50° C., a practical storage stability cannot be obtained. If the glass transition temperature is higher than 80° C, the softening temperature becomes high and the fixing property is adversely influenced. A lower softening temperature is preferable for the improvement of the fixing property. However, it is practically sufficient if the softening temperature is not higher than 145° C.

The resin of the present invention is characterized in that the softening temperature is low even though the glass transition temperature is high. This characteristic is due to the presence of the alicyclic diol used in the present invention. In the resin of the present invention, the difference between the glass transition temperature and the softening temperature must be not larger than 75° C., preferably not larger than 70° C. The resin must have a sufficient offset resistance, and the fixing-possible temperature range must cover a range of at least 30° C., preferably at least 50° C.

The fixing-possible temperature range referred to herein is determined according to the following method. A heat roll having a diameter of 60 mm and a rubber roll having a diameter of 60 mm is set so that the contact width (measured after a polyvinyl chloride sheet is inserted between the rolls and is whitened by heating) is 7 mm (this roll assembly will be called "fixing tester" hereinafter), and a paper sheet having a resin sample carried thereon is passed through between the rolls at a speed of 200 mm/sec. Then, the resin is peeled by using a Cellophane adhesive tape (supplied by Nichi-Ban) and the weight of the resin after peeling is measured. The temperature T1 of the heat roll at which 90% of the resin before peeling is left after peeling is determined. For this measurement, a methods is effectively adopted in which 5 parts by weight of carbon black is kneaded into 95 parts by weight of the resin, the composition is pulverized to an average particle diameter of 5 to 20 μm and coated on a paper sheet, and the coated sheet is passed through heating rollers to fix the resin on the paper sheet. For determining the fixing degree, the density is measured before and after the peeling of the tape by using a densitometer (supplied by Macbeth), and the temperature at which the value of (density after peeling of tape)/(density before peeling of tape) is 0.9 is designated as T1.

The upper limit of the fixing temperature is the temperature (hot offset temperature) at which the resin first adheres to the heat roll when the temperature of a Teflon-coated heat roll is elevated and the resin-coated paper sheet is passed through the fixing tester, and this temperature is designated as T2. The fixingpossible temperature range referred to in the present invention is the difference (T2−T1) between T2 and T1.

The polyester resin of the present invention can be synthesized according to a customary polyester-synthesizing process, for example, a method comprising performing an esterification reaction between an acid component and an alcohol component, or an ester exchange reaction, and removing a diol having a low boiling point from the reaction system in vacuum or under a nitrogen current.

When the polyester resin of the present invention is used as a binder for a toner, a sufficient fixingpossible temperature range is given and a softening temperature is low even through Tg is high. Since a specific amount of a secondary diol is used for the synthesis of the polyester, the reaction can be easily controlled and the obtained resin has an appropriate impact resistance. Accordingly, a toner formed by using the obtained resin as the binder retains good mechanical and morphological stabilities for a long time.

As is apparent from the foregoing description, the present invention makes great contributions to the field of toners for use in developing electric and magnetic latent images.

The present invention will now be described in detail with reference to the following examples. In the examples, all of "parts" and "%" are by mole.

EXAMPLES 1 THROUGH 5

Monomers selected from trivalent or higher carboxylic acids, aromatic dicarboxylic acids, alicyclic diols and other diol components were charged into an autoclave having a distillation column, and esterification reaction was carried out. Then, antimony trioxide was added in an amount of 500 ppm based on the acid components, and polycondensation was carried out while removing the glycol from the reaction system under vacuum of 3 Torr, whereby a crosslinked polyester shown in Table 1 was obtained.

Carbon black was added to the crosslinked polyester, and the mixture was kneaded, cooled, pulverized and classified to obtain a toner of the present invention consisting of particles having an average particle diameter of 10 to 13 μm.

With respect to each of the obtained crosslinked polyesters, the contents of constituent units, the glass transition temperature, the softening temperature, the lowest fixing temperature of the toner and the offset-occurring temperature were examined.

The contents of constituent units were determined by hydrolyzing the crosslinked polyester and subjecting the hydrolyzed polyester to the liquid chromatography and gas chromatography according to conventional procedures.

The glass transition temperature Tg was expressed by the temperature at the point of intersection between the base line of the chart obtained by the measurement conducted at a constant temperature-elevating rate of 5° C./min in a nitrogen atmosphere by using DSC (differential scanning calorimeter) and the tangential line on the endothermic curve in the vicinity of the glass transition temperature. A sample obtained by heating the resin at 100° C. for 10 minutes and rapidly cooling it with dry ice was used as the measurement sample.

The acid value was calculated from the results of the neutralization titration in a 1/50 N solution of KOH in benzyl alcohol with use of Methyl Orange as the indicator.

The lowest fixing temperature was determined according to the above-mentioned tape peeling method. Namely, a Cellophane tape (Nichi-Ban No. 405) was attached to the toner-fixed paper sheet and the tape was peeled, and the density of the toner before and after peeling was measured by a reflection type densitometer (supplied by Macbeth). The fixing ratio was expressed by the ratio of the density after peeling to the density before peeling. The lowest fixing temperature was the temperature at which the fixing ratio reached 90%.

The offset-occurring temperature was determined in the following manner. The toner image was transferred in the same manner as adopted for determining the lowest fixing temperature, and the fixing treatment was carried out by the above-mentioned fixing tester. Then, a white transfer sheet was fed to the fixing tester under the same condition and it was checked whether or not contamination was caused with the toner. This operation was repeated while gradually elevating the temperature of the heat roller of the fixing tester. The offset-occurring temperature was expressed by the lowest temperature at which contamination with the toner was caused.

TABLE 1

| Example No. | | 1 | 2 | 3 | 4 | 5 |
|---|---|---|---|---|---|---|
| Acid component units | | | | | | |
| Trimellitic anhydride units | (%) | 10 | 15 | 15 | 7 | 10 |
| Terephthalic acid units | (%) | 60 | 75 | 85 | 50 | 60 |
| Isophthalic acid units | (%) | 30 | 10 | 0 | 40 | 30 |
| Alcohol component units | | | | | | |
| BPPO*1 units | (%) | 50 | 30 | 30 | 0 | 30 |
| Ethylene glycol units | (%) | 44 | 40 | 40 | 45 | 40 |
| 1,4-cyclohexanediol units | (%) | 6 | 30 | 0 | 0 | 0 |
| Hydrogenated bisphenol A units | (%) | 0 | 0 | 30 | 55 | 30 |
| Properties of crosslinked polyester | | | | | | |
| Acid value | (mg -KOH/g) | 5 | 8 | 13 | 2 | 6 |
| Tg | (°C.) | 67 | 69 | 74 | 77 | 68 |
| Softening temperature | (°C.) | 124 | 123 | 137 | 144 | 124 |
| Properties of toner | | | | | | |
| Lowest fixing temperature (T1) | (°C.) | 145 | 145 | 160 | 176 | 145 |
| Hot offset temperature (T2) | (°C.) | 220< | 220< | 220< | 220< | 220< |

Note
*1BPPO represents polyoxypropane-(2,3)-2,2-bis(4-hydroxyphenyl)propane.
2Each unit content is based on the total acid units.

The softening temperature was measured at a constant temperature-elevating rate of 3° C./min under a load of 30 kg through a nozzle with an orifice having a diameter of 1 mm and a length of 1 mm by using a flow tester (Model CFT-500 supplied by Shimadzu Corp.), and the temperature at which ½ of 1 g of the sample began to flow out was designated as the softening point.

EXAMPLES 6 THROUGH 9

Polyester resins were prepared in the same manner as described in Examples 1 through 5 except that a trihydric or higher polyhydric alcohol was used as the crosslinking agent. The results are shown in Table 2.

TABLE 2

| Example No. | | 6 | 7 | 8 | 9 |
|---|---|---|---|---|---|
| Acid component units | | | | | |
| Terephthalic acid units | (%) | 50 | 60 | 80 | 50 |
| Isophthalic acid units | (%) | 50 | 40 | 20 | 50 |
| Alcohol component units | | | | | |
| Trimethylol propane units | (%) | 5 | 0 | 0 | 0 |
| Pentaerythritol units | (%) | 0 | 5 | 5 | 2 |
| Neopentyl glycol units | (%) | 20 | 40 | 0 | 0 |
| BPPO*1 units | (%) | 40 | 0 | 20 | 10 |
| Ethylene glycol units | (%) | 20 | 30 | 50 | 45 |
| 1,4-cyclohexanediol units | (%) | 15 | 25 | 0 | 0 |

TABLE 2-continued

| Example No. | | 6 | 7 | 8 | 9 |
|---|---|---|---|---|---|
| Hydrogenated bisphenol A units | (%) | 0 | 0 | 25 | 45 |
| Properties of crosslinked polyester | | | | | |
| Acid value | (mg-KOH/g) | 7 | 1 | 16 | 2 |
| Tg | (°C.) | 63 | 56 | 67 | 75 |
| Softening temperature | (°C.) | 125 | 118 | 131 | 141 |
| Properties of toner | | | | | |
| Lowest fixing temperature (T1) | (°C.) | 145 | 135 | 160 | 171 |
| Hot offset temperature (T2) | (°C.) | 220< | 220< | 220< | 220< |

Note
[1] BPPO represents polyoxyethylene-(2,3)-2,2-bis(4-hydroxyphenyl)propane.
[2] Each unit content is based on the total acid units.

COMPARATIVE EXAMPLES 1 AND 2

Polyester resins were prepared in the same manner as described in Examples 1 through 9 except that an alicyclic diol was not used. The results are shown in Table 3.

TABLE 3

| Comparative Example No. | | 1 | 2 |
|---|---|---|---|
| Acid component units | | | |
| Trimellitic anhydride units | (%) | 15 | 0 |
| Terephthalic acid units | (%) | 70 | 100 |
| Isophthalic acid units | (%) | 15 | 0 |
| Alcohol component units | | | |
| Pentaerythritol units | (%) | 0 | 5 |
| BPPO[1] units | (%) | 0 | 40 |
| Ethylene glycol units | (%) | 100 | 55 |
| Properties of crosslinked polyester | | | |
| Acid value | (mg-KOH/g) | 13 | 6 |
| Tg | (°C.) | 54 | 59 |
| Softening temperature | (°C.) | 148 | 141 |
| Properties of toner | | | |
| Lowest fixing temperature | (°C.) | 175 | 170 |
| Hot offset temperature | (°C.) | 220 | 220< |

Note
[1] BPPO represents polyoxypropylene-(2,3)-2,2-bis(4-hydroxyphenyl)propane.
[2] Each unit content is based on the total acid units.

We claim:

1. A crosslinked polyester resin which is a non-linear polycondensate comprising (a) 1 to 30 moles%, based on total acid units, of units of a trihydric or higher alcohol or units of a trivalent or higher carboxylic acid, (b) 1 to 60 mole%, based on the total acid units, of units of an alicyclic diol in which at least one alcohol moiety is a secondary alcohol, (c) 40 to 100 mole%, based on the total acid units, of units of an aromatic dicarboxylic acid and (d) 40 to 99 mole%, based on the total acid units, of units of a non-alicyclic diol, said resin having an acid value of 0.5 to 25 mg-KOH/g, a glass transition temperature of 50° to 80° C., a softening temperature not higher than 145° C., a fixing temperature range of at least 30° C., and a difference between the softening temperature and the glass transition temperature not larger than 75° C.

2. The crosslinked polyester resin of claim 1 wherein the units of the trihydric or higher alcohol are represented by the following formula:

$$(HO)_m R_1 (O)_n$$

wherein m and n are integers satisfying the requirements of $(m+n) \geq 3$, $m \geq 0$ and $n \geq 1$, and $R_1$ represents a hydrocarbon residue.

3. The crosslinked polyester resin of claim 1 wherein the units of the trivalent or higher carboxylic acid are represented by the following formula:

$$(R_3 OCO)_m, R_2(CO)_n$$

wherein m' and n' are integers satisfying the requirements of $(m'+n') \geq 3$, $m' \geq 0$ and $n' \geq 1$, $R_2$ represents a hydrocarbon residue and $R_3$ represents an alkyl group having 1 to 6 carbon atoms or a hydrogen atom.

4. The crosslinked polyester resin of claim 1 wherein the total amount of the units of the trihydric or higher alcohol and the units of the trivalent or higher carboxylic acid is 3 to 20 mole% based on the amount of total acid units in the crosslinked polyester.

5. The crosslinked polyester resin of claim 1 wherein the units of the alicyclic diol are represented by the following formula:

$$(HO)_j, R_4 (O)_k$$

wherein j and k are integers satisfying the requirements of $j \geq 0$, $k \geq 1$ and $(j+k) = 2$, and $R_4$ represents an alicyclic hydrocarbon residue, with the proviso that at least one oxygen atom is bonded to a secondary carbon atom of $R_4$.

6. The crosslinked polyester resin of claim 1 wherein the amount of the units of the alicyclic diol is 5 to 50 mole% based on the amount of the total acid units.

7. The crosslinked polyester resin of claim 1 wherein the units of the aromatic dicarboxylic acid are represented by the formula:

$$(R_6 OCO)_j, R_5 (CO)_k,$$

wherein j' and k' are integers satisfying the requirements of $(j'+k') = 2$, $j' \geq 0$ and $k' \geq 1$, $R_5$ represents a hydrocarbon residue and $R_6$ represents an alkyl group having 1 to 6 carbon atoms or a hydrogen atom.

8. The crosslinked polyester resin of claim 1 wherein the amount of the units of the aromatic dicarboxylic acid is 50 to 100 mole% based on the amount of the total acid units.

9. The crosslinked polyester resin of claim 1 wherein the units of the non-alicyclic diol are represented by the following formula:

$$(HO)_{j''} R_7 (O)_{k''}$$

wherein j'' and k'' are integers satisfying the requirements of $(j''+k'') = 2$, $j'' \geq 0$ and $k'' \geq 1$, and $R_7$ represents a non-circular hydrocarbon residue.

10. The crosslinked polyester resin of claim 1 which has an acid value of 2 to 20 mg-KOH/g.

11. The crosslinked polyester resin of claim 1 wherein the difference between the softening temperature and the glass transition temperature is not larger than 70° C.

12. The crosslinked polyester resin of claim 1 wherein the fixing temperature range is at least 50° C.

* * * * *